(12) United States Patent
Leizerovich et al.

(10) Patent No.: US 6,728,525 B1
(45) Date of Patent: Apr. 27, 2004

(54) MULTIMODE TRANSCEIVER WITH MULTIPLE IF'S AND COMMON INJECTION

(75) Inventors: Gustavo V. Leizerovich, Aventura, FL (US); Peter J. Yeh, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 527 days.

(21) Appl. No.: 09/654,538

(22) Filed: Sep. 1, 2000

(51) Int. Cl.[7] ................................................. H04B 7/00
(52) U.S. Cl. ................. 455/260; 455/168.1; 455/127.4; 455/293
(58) Field of Search ............................. 455/260, 255, 455/293, 168.1, 216, 127.4, 414.1, 553.1, 552.1; 375/350, 327, 332, 344, 347; 370/478, 480

(56) References Cited

U.S. PATENT DOCUMENTS

| | | | |
|---|---|---|---|
| 5,966,646 A | 10/1999 | Lampe et al. ............ | 455/189.1 |
| 6,208,875 B1 * | 3/2001 | Damgaard et al. .......... | 455/552 |
| 6,327,463 B1 * | 12/2001 | Welland ..................... | 455/260 |
| 6,393,299 B1 * | 5/2002 | Mizumoto et al. .......... | 455/552 |
| 6,487,219 B1 * | 11/2002 | Snider ........................ | 455/552 |
| 2001/0031627 A1 * | 10/2001 | Ries ........................... | 455/258 |
| 2002/0039894 A1 * | 4/2002 | Yoshida et al. ............. | 455/265 |

* cited by examiner

*Primary Examiner*—Edward F. Urban
*Assistant Examiner*—Thuan T. Nguyen
(74) *Attorney, Agent, or Firm*—Scott M. Garrett

(57) ABSTRACT

A system and method is provided for generating a second LO signal to a second mixer of a plurality of receivers employed in a multimode communication device. A single PLO and VCO provides a high frequency second LO signal that is divided by divider components to provide a number of lower frequency second LO signals. The different high frequency second LO signal and the number of lower frequency second LO signals may be utilized for providing second LO signals for component employed in receiving communications from radio devices employing different communication standards and/or frequency ranges.

6 Claims, 3 Drawing Sheets

MULTIMODE TRANSCEIVER WITH MULTIPLE IF'S AND COMMON INJECTION

TECHNICAL FIELD

The present invention generally relates to communication systems, and in particular to a system and method for providing a communication system that operates in multiple communication modes.

BACKGROUND OF THE INVENTION

Radio frequency devices communicate over different frequency ranges when operating in different communication standards or modes. For example, radio frequency devices employing the Global System for Mobile Communications (GSM) standard operate within a relatively high frequency range, while some other radio frequency devices utilizing other communication standards operate within lower frequency ranges, such as the Advanced Mobile Phone Service (AMPS) and the Integrated Digital Enhancement Network (iDEN). Other standards such as Personal Communication Service (PCS), United States Digital Cellular (USDC), Code Division Multiple Access (CDMA) also provide for radio devices to operate in different frequency ranges.

Phase locked loop (PLLs) devices and voltage controlled oscillators (VCOs) have been used in conventional radio systems to supply a local oscillator (LO) signal for a radio's receiver. The incoming RF signal is mixed with the LO signal to provide a lower intermediate frequency at which filtering and amplification are more readily achieved. Achieving the filter selectivity needed to reject interfering signals during the amplification and filtering of the incoming RF signal is simpler and more economical at a lower intermediate frequency, which is well known to those skilled in the art of radio system design.

A radio receiver may be a double super heterodyne receiver, which employs a first and a second LO signal. The first LO produces a first local signal which is related to the reference signal as regards to its frequencies. The second LO produces a second local signal which is not related to the reference signal in frequency. A mixing section is provided that includes a first and second mixing unit. The first mixing unit may be connected to the receiving section and the first LO for mixing the received signal with the first local signal to produce a first intermediate (IF) signal. The second mixing unit is connected to the first mixing unit and the second LO for mixing the first IF signal with the second local signal to produce a second IF signal.

Some radio frequency devices are designed to employ multiple modes or standards. These devices allow for selection between the different modes or standards by a switch, a programmable input or some other mechanism. Multiple mode radio systems employ separate dedicated PLLs and VCOs to provide the second LOs per mode of operation for multimode receivers used in multimode radio systems. A single VCO and a PLL may include over 25 parts and takes up a substantial amount of cost and real estate with regards to the entire radio device. Therefore, it is desirable to provide a less expensive and more convenient approach for providing a second LO signal to a second mixer to generate a second IF signal for a receiver for each mode in a multimode radio system.

DETAILED DESCRIPTION OF THE INVENTION

The present invention relates to a system and/or method for providing a second LO signal to a second mixer of a double super heterodyne receiver or the like employed in a multimode communication device. A single PLO and VCO provides a high frequency second LO signal that is divided by divider components to provide a number of lower frequency second LO signals. The different high frequency second LO signal and the number of lower frequency second LO signals may be utilized for providing second LO signals for components employed in receiving communications from radio devices employing different communication standards and/or frequency ranges. While the following description of one aspect of the present invention primarily relates to a mobile communications unit, it will be understood and appreciated by those skilled in the art that a system and/or method in accordance with the present invention also may be implemented in conjunction with other types of telecommunications units.

Figure 1:
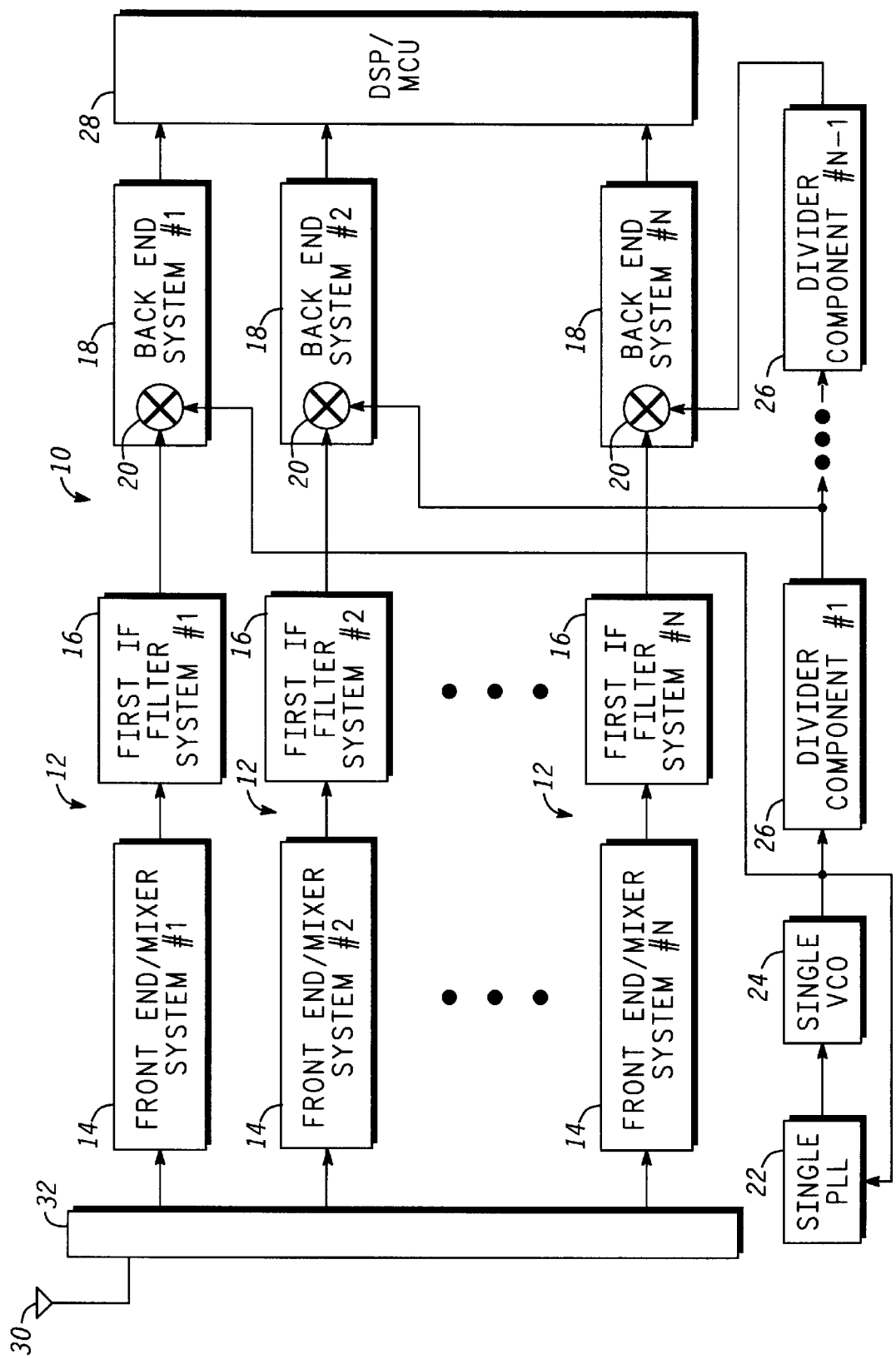
FIG. 1 is a functional schematic block representation of a communication system in accordance with the present invention.

FIG. 1 illustrates a communication system 10 including a plurality of radio receiver systems 12 labeled system 1-N. Each radio receiver system 12 is operable to receive radio communications from communications devices employing different communication modes or standards (e.g., GSM, AMPS, iDEN, PCS, USDC, CDMA) operating within different frequency ranges. Each radio receiver system 12 has a system front end first injection and mixing component 14 for injecting a first frequency into a received signal. The first injected signal is set at a specific frequency relative to the frequency range of the particular communications standard being employed. The injected signal and the received signal are mixed by a first mixer (not shown) at the front end first injection and mixing component 14 to produce a first IF signal. The front end first injection and mixing component 14 is coupled to a first IF bandpass filter 16 adapted to filter the first IF signal. The operation and configuration of the front end first injection and mixing component 14 and the first IF bandpass filter 16 are well known to those in the art of design of wireless communications devices. Therefore, additional details of the front end first injection and mixing component 14 and the first IF bandpass filter 16 have been left out for the sake of brevity.

The first IF filter 16 is coupled to a system backend component 18 employing a second mixer 20. The second mixer 20 receives a second injected frequency signal or voltage oscillator (VO) signal derived from a single PLL component 22. The single PLL component 22 provides a variable voltage control signal to a single VCO for varying a high injection frequency signal that provides the second LO function to the radio receiver system #1. The frequency of the high injection frequency signal can be varied based on the supplied variable voltage signal from the single PLL component 22.

The high injection frequency signal is then transmitted to a first divider component 26 to provide an additional lower second injection frequency signal for backend component 18 for system #2. This lower second injection frequency signal is continually divided down through N-1 divider components to provide subsequent lower injections frequency signals for systems up to system #N. Variations in the injection signals also can be achieved by varying the voltage received by the single VCO component 24 from the single PLL component 22. Any number of second LO signals may be provided for different communication standard or modes employing a single PLL and a single VCO by variations of the voltage supplied to the VCO by the PLL and dividing down the high frequency LO signal to a lower frequency LO signal.

A radio communication is received via an antenna 30 through an antenna switch/multiplexer 32 which switches the communication to one of the radio receiver systems 12 based on a predetermined mode selection. The predetermined mode selection can be made employing a mechanical switch or be programmable through a user input device, such as a keyboard. It is to be appreciated that a variety of methodologies may be employed for selecting the particular radio system to employ based on the particular communication mode or standard desired. The radio receiver system 12 injects a first frequency signal into the received radio signal in the front end first injection and mixing component 14 to generate a first IF signal, which is then filtered through the first IF filter 16. The first IF signal is then transmitted to the back end component 18 where the first IF signal is mixed with the particular LO signal corresponding to the particular standard being received by the communication system 40 to produce a second IF signal. The second IF signal is then filtered and amplified (not shown) in the system backend component 18 prior to transmitting to a digital signal processor 28 acting as a master control unit.

Figure 2:
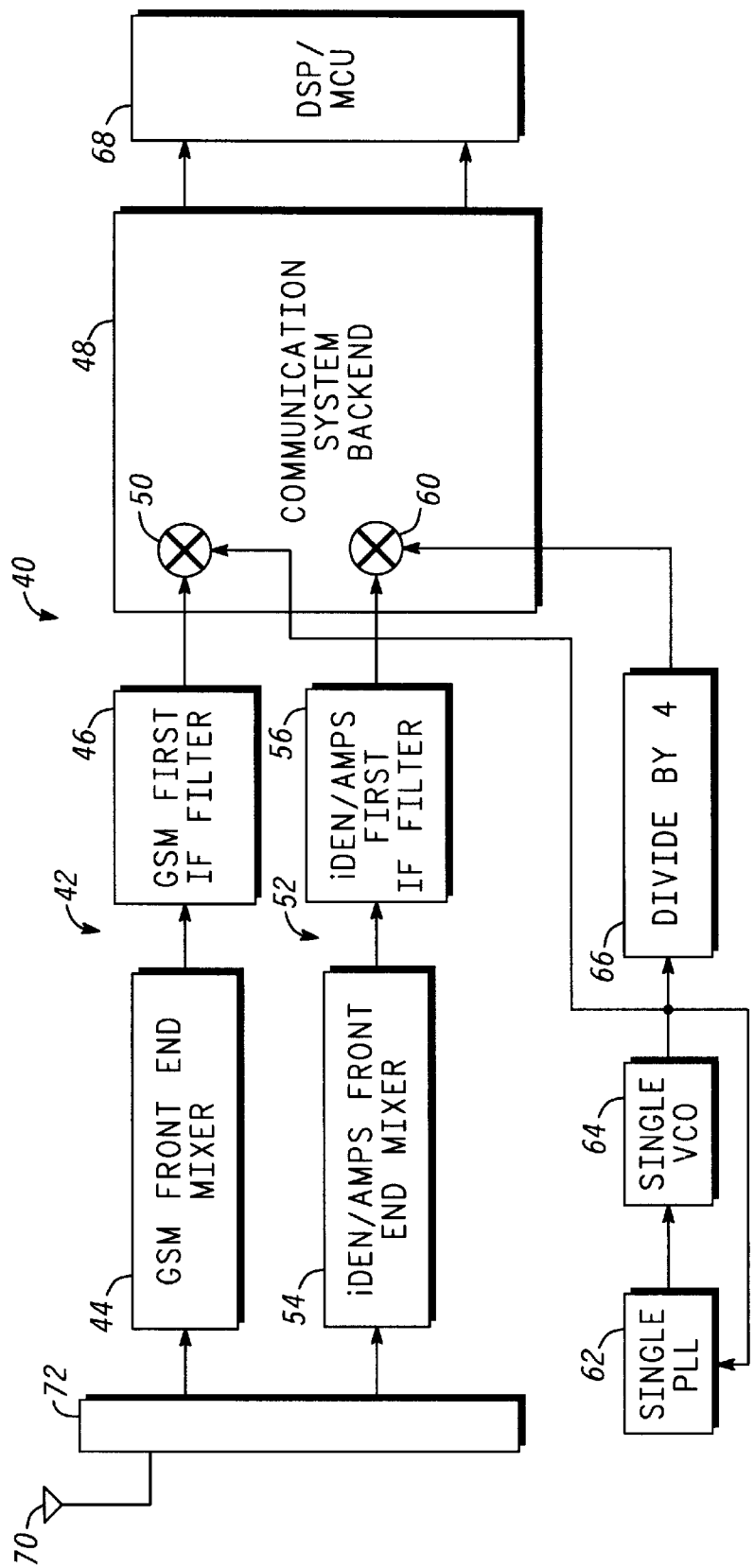
FIG. 2 is a functional schematic block representation of a communication system in accordance with the present invention.

FIG. 2 illustrates a particular example of employing the present invention to the GSM communication standard, the iDEN standard and the AMPS standard. A communication system 40 comprises a first receiver system 42 for receiving communications from devices employing the GSM standard and a second receiver system 52 for receiving communications from devices employing the iDEN or AMPS standard. The communication system 40 is operable to receive radio communications over either the first receiver system 42 or the second receiver system 52 based on a predefined selection of the particular standard being employed by the communications system 40. The selection can be made employing a mechanical switch or be programmable through a user input device, such as a keyboard. It is to be appreciated that a variety of methodologies may be employed for selecting the particular radio system to employ based on the particular communication mode or standard desired.

The first receiver system 42 includes a GSM front end first injection and mixing component 44 coupled to a GSM first IF bandpass filter 46. The GSM front end first injection and mixing component 54 injects a first injection signal having a frequency relative to the communication ranges required by the GSM standard to generate a first IF signal. Radio devices employing the GSM standard operate within the frequency range of 925–960 MHZ. The second radio receiver system comprises an iDEN/AMPS front end first injection and mixing component 54 coupled to a first IF bandpass filter 56. The iDEN/AMPS first injection and mixing component 54 injects a first injection signal having a frequency relative to the communication ranges required by the iDEN standard and/or the AMPS standard to generate a first IF signal. Radio devices employing the iDEN standard operate within a frequency range of 851–870 MHZ, while radio devices employing the AMPS standard operate within a frequency range of 869–894 MHZ.

The particular operation and configuration of the front end first injection and mixing components 44 and 54 and the first IF bandpass filter 46 and 56, are well known to those in the art of designing wireless communications devices. Therefore, the details of the front end first injection and mixing components 44 and 54 and the first IF bandpass filter 46 and 56 have been left out for the sake of brevity.

The GSM first IF bandpass filter 46 is coupled to a GSM second mixer component 50 in a communication system backend component 48. The GSM second mixer component 50 receives a second injected frequency signal derived from a single PLL component 62 and a single VCO component 64. The single PLL component 62 provides a variable voltage control signal to the single VCO component 64 for varying a high frequency injection signal that provides the second LO function for the receiver system 42. The frequency of the high frequency injection signal can be varied based on the supplied variable voltage signal from the single PLL component 64.

The high frequency injection signal is then transmitted to a divide by four component 66 to provide an additional second lower frequency injection signal for receiver system 52. This second lower frequency injection signal is fed to an iDEN/AMPS second mixer component 60 along with the iDEN/AMPS first IF signal from the iDEN/AMPS first bandpass filter of the second receiver system 52. Variations in the injections signals also can be achieved by varying the voltage received by the single VCO component 64 from the single PLL component 62. For example, the single PLL 62 and the single VCO 64 are locked at an injection frequency of 800 MHZ when the communications system 40 is in a GSM mode. Alternatively, the single PLL 62 and the single VCO 64 are locked at an injection frequency of 896.56 MHZ when the communications system 40 is in an iDEN or IS136/AMPS mode.

A radio communication is received via an antenna 70 through a switch/duplexer 72 which switches the communication to one of the radio receiver systems 42 or 54 based on a predetermined mode selection. The selection can be made employing a mechanical switch or be programmable through a user input device, such as a keyboard. It is to be appreciated that a variety of methodologies may be employed for selecting the particular radio system to employ based on the particular communication mode or standard desired. When the GSM mode is selected, the switch duplexer 72 switches incoming radio signals to the GSM front end injection and mixer component 44. The front end injection and mixer component 44 injects an injection signal to provide a 400 MHZ first IF. The first IF is filtered through the GSM first IF filter and transmitted to a second injection and mixing component 50. The single VCO 64 directly feeds the GSM second mixer with an 800 MHZ signal. The 800 MHZ signal is dived by two at the mixer 50 to generate a quadrature injection at 400 MHZ. The output of the mixer 50 is GSM zero IF signals. The output signal is then filtered and amplified (not shown) prior to being transmitted and processed by a digital signal processor 68 acting as a master control unit 68.

When the iDEN mode is selected, the switch duplexer 72 switches incoming radio signals to the iDEN/AMPS front end first injection and mixer component 54. The iDEN/AMPS front end first injection and mixing component 54 injects an injection signal to provide a 112.32 MHZ first IF. The first IF is filtered through the iDEN/AMPS first IF filter 56 and transmitted to the second injection and mixer component 60. The output of the divide by four component 66 feeds the iDEN/AMPS second mixer with a 226.64 MHZ signal. The 226.64 MHZ signal is dived by two at the mixer 60 to generate a quadrature injection at 112.32 MHZ. The value 112.32 MHZ was chosen over the conventional value of 109.65 MHZ to avoid having the VCO running at 8×109.65 MHZ which falls in the AMPS receiving bandwidth. The output of the mixer 60 is iDEN zero IF signals. The output signal is then filtered and amplified (not shown) prior to being transmitted and processed by the digital signal processor 68 acting as the master control unit.

Figure 3:
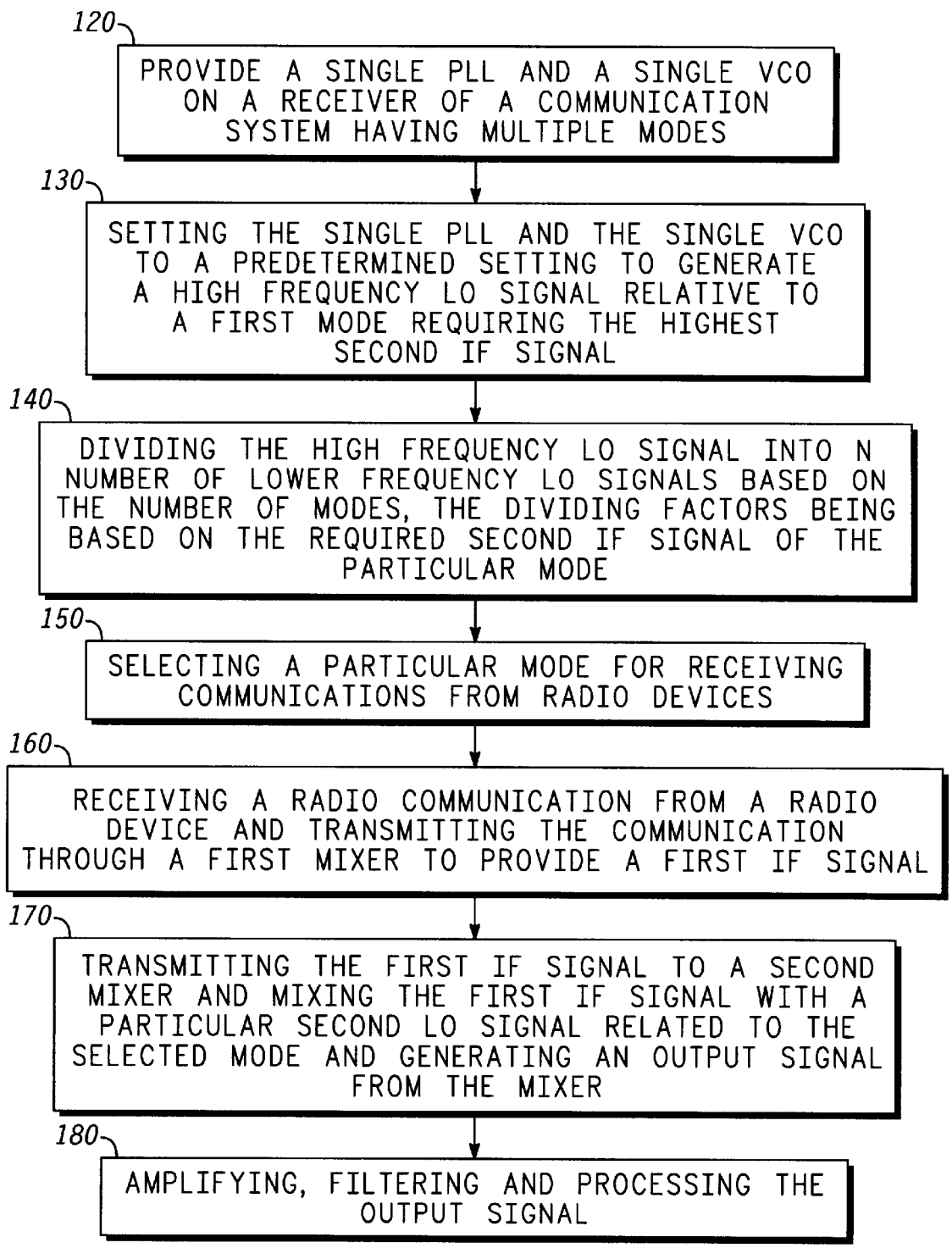
FIG. 3 is a flow diagram illustrating a methodology for providing second Lo signals for multiple receivers in a multimode communication system in accordance with the present invention.

In view of the structure described above with respect to FIGS. 1–2, a methodology for providing second LO injections signals for multimode communications systems with a single PLL and a single VCO device may be better appreciated with respect to the flow diagram of FIG. 3. While, for purposes of simplicity of explanation, the methodology of FIG. 3 is shown and described as a series of steps, it is to be understood and appreciated that the present invention is not limited to the order of steps, as some steps may, in accordance with the present invention, occur in different orders and/or concurrently with other steps from that shown and described herein. Moreover, not all illustrated steps may be required to implement a methodology in accordance with an aspect of the present invention.

Referring to FIG. 3, the process begins at step 120 in which a single PLL and a single VCO is provided on a communication system having multiple mode capabilities and including separate double heterodyne receiver systems for various respective modes that the communication system is capable of receiving communications. From step 120, the process proceeds to step 130. At step 130 the single PLL and the single VCO is set to a predetermined setting to generate a high frequency LO signal relative to a first mode requiring the highest frequency LO signal. The process then advances to step 140 where the high frequency LO signal is divided into N number of lower frequency LO signals based on the number of modes that the multimode communication device is capable of performing. The division factor for generating each lower frequency LO signal is based on the desired second IF signal for each of the N respective modes.

The process then proceeds to step 150 where the particular mode for receiving communications from radio devices is selected. At step 160, the communication system receives a radio communication from a radio device and transmits the communication through a first mixer to provide a first IF signal. At step 170, the first IF signal is then transmitted to a second mixer, which mixes the first IF signal with a particular one of the generated second LO signals derived from the single PLL and the single VCO related to the mode selected. The second mixer then generates an output signal. The output signal is amplified, filtered and processed in step 180.

What has been described above includes one or more examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the terms "includes" and variations thereof and "having" and variations thereof are used in either the detailed description or the claims, such term is intended to be inclusive in a manner similar to the term "comprising."

What is claimed is:

1. A multimode communication system having a multiple receiver systems employing a first and a second mixer for injecting LO signals into a received signal, the system comprising:

a single PLL and a single VCO operable for providing a first injection frequency signal functioning as a second LO signal to a second mixer of a first receiver system; and a plurality of divider components adapted to provide a plurality of lower frequency injection signals to provide multiple second LO signals for multiple second mixers corresponding to a plurality of different receiver systems.

2. The system of claim 1, the communication system further comprising a selection component operable to allow a user to select a communication mode for allowing the communication system to receive transmissions from radio devices conforming to a communication standard corresponding to the selected communication mode.

3. The system of claim 2, the communication system further comprising an antenna coupled to an antenna switch multiplexer, the antenna switch multiplexer being operable to switch received communications to one of the multiple receiver systems based on the selected mode.

4. The system of claim 1, wherein the plurality of divider components includes a divide by four divider component operable for providing a single lower frequency injection signal to a second mixer of a second receiver, the single lower frequency injection signal having a frequency that is ¼ of the first injection frequency signal.

5. The system of claim 4, the first receiver being operable to receive communications from radio devices employing a GSM standard and the second receiver being operable to receive communications from radio devices employing at least one of an iDEN and an AMPS standard.

6. The system of claim 5, the second mixer component of the first receiver being operable to divide the frequency of the first injection frequency signal in half and mix the divided first injection frequency signal with a first IF signal generated by a first mixer of the first receiver to generate a second IF signal for the first receiver and the second mixer component of the second receiver being operable to divide the frequency of the single lower frequency injection signal in half and mix the divided single lower frequency injection signal with a first IF signal generated by a first mixer of the second receiver to generate a second IF signal for the second receiver.

\* \* \* \* \*